(12) United States Patent
Oerlemans (10) Patent No.: US 11,359,600 B2
(45) Date of Patent: Jun. 14, 2022

(54) AERODYNAMIC STRUCTURE

(71) Applicant: Siemens Gamesa Renewable Energy A/S, Brande (DK)

(72) Inventor: Stefan Oerlemans, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/445,334

(22) Filed: Jun. 19, 2019

(65) Prior Publication Data

US 2020/0003178 A1 Jan. 2, 2020

(30) Foreign Application Priority Data

Jun. 27, 2018 (EP) .................................... 18180141

(51) Int. Cl.
*F03D 1/06* (2006.01)
(52) U.S. Cl.
CPC .......... *F03D 1/0683* (2013.01); *F03D 1/0633* (2013.01); *F03D 1/0641* (2013.01); *F03D 1/0675* (2013.01); *F05B 2240/122* (2013.01); *F05B 2240/221* (2013.01); *F05B 2240/301* (2013.01); *F05B 2240/3062* (2020.08); *F05B 2240/32* (2013.01); *F05B 2260/96* (2013.01)
(58) Field of Classification Search
CPC .... F03D 1/0683; F03D 1/0675; F03D 1/0633; F03D 1/0641; F03D 1/0296; F05B 2260/96; F05B 2260/962; F05B 2240/301; F05B 2240/221; F05B 2240/127; F05B 2240/32; F05B 2240/122; F05B 2240/304; B64C 2230/14; B64C 2230/28; B64C 21/10; B64C 23/005; B64C 23/06; B64C 23/065
See application file for complete search history.

(56) References Cited

U.S. PATENT DOCUMENTS

| | | | |
|---|---|---|---|
| 1,446,011 | A | 2/1923 | Jackson |
| 2,010,094 | A | 8/1935 | Leinweber |
| 2,071,012 | A | 2/1937 | Adams |
| 2,099,229 | A | 11/1937 | Possenheim |

(Continued)

FOREIGN PATENT DOCUMENTS

| | | |
|---|---|---|
| CA | 2719171 A1 | 2/2010 |
| CN | 101297112 A | 10/2008 |

(Continued)

OTHER PUBLICATIONS

CN106481517—Translation (Year: 2017).*

(Continued)

*Primary Examiner* — Woody A Lee, Jr.
*Assistant Examiner* — Behnoush Haghighian
(74) *Attorney, Agent, or Firm* — Schmeiser, Olsen & Watts LLP (57) ABSTRACT

Provided is an aerodynamic structure for mounting to a surface of a wind turbine rotor blade, which aerodynamic structure includes a plurality of rectangular comb elements and/or a plurality of angular comb elements, wherein a comb element includes comb teeth arranged in a comb plane that subtends an angle to the surface of the rotor blade. The embodiments further describe a wind turbine rotor blade including such an aerodynamic structure.

13 Claims, 6 Drawing Sheets

(56) References Cited

U.S. PATENT DOCUMENTS

| | | | | |
|---|---|---|---|---|
| 2,126,813 A * | 8/1938 | Reid | ............... | B64C 11/16 |
| | | | | 416/23 |
| 4,128,363 A | 12/1978 | Fujikake et al. | | |
| 5,088,665 A | 2/1992 | Vijgen et al. | | |
| 5,533,865 A * | 7/1996 | Dassen | ............... | F03D 1/0608 |
| | | | | 416/228 |
| 6,105,904 A | 8/2000 | Lisy et al. | | |
| 6,733,240 B2 * | 5/2004 | Gliebe | ............... | F04D 29/324 |
| | | | | 416/228 |
| 6,837,465 B2 | 1/2005 | Lisy et al. | | |
| 7,293,959 B2 * | 11/2007 | Pedersen | ............... | F03D 7/043 |
| | | | | 416/23 |
| 7,566,203 B2 * | 7/2009 | Moser | ............... | F03D 1/0633 |
| | | | | 416/235 |
| 7,909,576 B1 | 3/2011 | van der Bos et al. | | |
| 7,914,259 B2 * | 3/2011 | Godsk | ............... | F03D 1/0641 |
| | | | | 416/146 R |
| 7,918,653 B2 | 4/2011 | Standish et al. | | |
| 7,927,078 B2 * | 4/2011 | Parsania | ............... | F03D 1/0675 |
| | | | | 416/235 |
| 7,954,769 B2 * | 6/2011 | Bushnell | ............... | B64C 9/02 |
| | | | | 244/213 |
| 7,976,283 B2 | 7/2011 | Huck | | |
| 8,047,784 B2 * | 11/2011 | Bonnet | ............... | F03D 1/0675 |
| | | | | 416/1 |
| 8,047,801 B2 * | 11/2011 | Fang | ............... | F03D 1/0633 |
| | | | | 416/235 |
| 8,083,488 B2 | 12/2011 | Fritz | | |
| 8,162,590 B2 | 4/2012 | Haag | | |
| 8,162,607 B2 * | 4/2012 | Grohmann | ............... | B64C 27/615 |
| | | | | 416/23 |
| 8,182,231 B2 * | 5/2012 | Corten | ............... | F03D 1/0641 |
| | | | | 416/223 R |
| 8,210,482 B2 | 7/2012 | Miller et al. | | |
| 8,267,657 B2 | 9/2012 | Huck et al. | | |
| 8,376,703 B2 * | 2/2013 | Carroll | ............... | F03D 1/0675 |
| | | | | 416/23 |
| 8,414,261 B2 * | 4/2013 | Bonnet | ............... | F03D 1/0641 |
| | | | | 416/1 |
| 8,430,633 B2 * | 4/2013 | Carroll | ............... | F03D 1/0675 |
| | | | | 416/23 |
| 8,430,638 B2 * | 4/2013 | Drobietz | ............... | F03D 1/0675 |
| | | | | 416/132 B |
| 8,491,262 B2 * | 7/2013 | McGrath | ............... | F03D 7/0264 |
| | | | | 416/1 |
| 8,506,250 B2 | 8/2013 | Bagepalli et al. | | |
| 8,523,515 B2 * | 9/2013 | Drobietz | ............... | F03D 1/0683 |
| | | | | 415/119 |
| 8,656,957 B2 | 2/2014 | Babinsky et al. | | |
| 8,678,746 B2 | 3/2014 | Haag | | |
| 8,746,053 B2 * | 6/2014 | Brake | ............... | F03D 1/0608 |
| | | | | 73/147 |
| 8,834,117 B2 * | 9/2014 | Yarbrough | ............... | F03D 80/30 |
| | | | | 416/146 R |
| 8,882,049 B2 * | 11/2014 | Shams | ............... | B64C 21/00 |
| | | | | 244/204 |
| 8,888,453 B2 | 11/2014 | Fuglsang et al. | | |
| 8,894,374 B2 | 11/2014 | Fuglsang et al. | | |
| 8,899,923 B2 * | 12/2014 | Hancock | ............... | F03D 7/0232 |
| | | | | 416/23 |
| 9,051,919 B2 | 6/2015 | Jensen et al. | | |
| 9,057,359 B2 | 6/2015 | Fuglsang et al. | | |
| 9,151,270 B2 * | 10/2015 | Eisenberg | ............... | F03D 1/0633 |
| 9,175,666 B2 * | 11/2015 | Eisenberg | ............... | F03D 1/0633 |
| 9,273,667 B2 | 3/2016 | Enevoldsen et al. | | |
| 9,347,427 B2 | 5/2016 | Fischer | | |
| 9,476,406 B2 | 10/2016 | Obrecht et al. | | |
| 9,546,001 B2 * | 1/2017 | Steinert | ............... | F16K 47/045 |
| 9,670,901 B2 | 6/2017 | Obrecht et al. | | |
| 9,719,488 B2 * | 8/2017 | Oerlemans | ............... | F03D 1/0675 |
| 9,777,703 B2 | 10/2017 | Madsen | | |
| 9,841,002 B2 | 12/2017 | Oerlemans | | |
| 9,932,960 B2 | 4/2018 | Petsche et al. | | |
| 9,945,357 B2 * | 4/2018 | Enevoldsen | ............... | F03D 7/0204 |
| 10,012,207 B2 | 7/2018 | Oerlemans et al. | | |
| 10,047,720 B2 | 8/2018 | Madsen et al. | | |
| 10,180,125 B2 * | 1/2019 | Carroll | ............... | F03D 1/0675 |
| 10,202,963 B2 | 2/2019 | Altmikus | | |
| 10,240,576 B2 | 3/2019 | Drack et al. | | |
| 10,247,169 B2 * | 4/2019 | Gonzalez | ............... | F03D 1/0641 |
| 10,480,483 B2 | 11/2019 | Hoeg et al. | | |
| 10,690,110 B2 * | 6/2020 | Church | ............... | F03D 1/0633 |
| 10,697,426 B2 * | 6/2020 | Hurault | ............... | F03D 1/0675 |
| 2001/0032907 A1 | 10/2001 | Borchers et al. | | |
| 2003/0175121 A1 | 9/2003 | Shibata et al. | | |
| 2007/0003403 A1 | 1/2007 | Pedersen et al. | | |
| 2007/0077150 A1 * | 4/2007 | Llorente Gonzalez | ............... | |
| | | | | F03D 1/0608 |
| | | | | 416/223 R |
| 2008/0166241 A1 | 7/2008 | Herr et al. | | |
| 2009/0016891 A1 * | 1/2009 | Parsania | ............... | F03D 1/0675 |
| | | | | 416/223 R |
| 2009/0068018 A1 | 3/2009 | Corten | | |
| 2009/0074585 A1 | 3/2009 | Koegler et al. | | |
| 2009/0087314 A1 | 4/2009 | Haag | | |
| 2009/0142193 A1 | 6/2009 | Bech | | |
| 2010/0008787 A1 * | 1/2010 | Godsk | ............... | F03D 1/0641 |
| | | | | 416/223 R |
| 2010/0047070 A1 * | 2/2010 | Slot | ............... | F03D 80/30 |
| | | | | 416/146 R |
| 2010/0080708 A1 | 4/2010 | Gupta et al. | | |
| 2010/0209258 A1 * | 8/2010 | Fuglsang | ............... | F03D 1/0633 |
| | | | | 416/90 R |
| 2010/0291852 A1 * | 11/2010 | Steinert | ............... | F16K 1/223 |
| | | | | 454/71 |
| 2011/0018282 A1 | 1/2011 | Hayashi et al. | | |
| 2011/0142635 A1 | 6/2011 | Fritz | | |
| 2011/0142637 A1 | 6/2011 | Riddell et al. | | |
| 2011/0142673 A1 * | 6/2011 | Fang | ............... | F03D 1/0633 |
| | | | | 416/241 R |
| 2011/0142676 A1 * | 6/2011 | Mohammed | ............... | F03D 1/0633 |
| | | | | 416/241 R |
| 2011/0152665 A1 | 6/2011 | Lai | | |
| 2011/0211954 A1 * | 9/2011 | Bonnet | ............... | F03D 1/0675 |
| | | | | 416/1 |
| 2011/0223030 A1 | 9/2011 | Huck et al. | | |
| 2011/0229321 A1 * | 9/2011 | Kilaras | ............... | F03B 3/121 |
| | | | | 416/1 |
| 2011/0268557 A1 | 11/2011 | Drack et al. | | |
| 2011/0268558 A1 | 11/2011 | Driver et al. | | |
| 2012/0027590 A1 * | 2/2012 | Bonnet | ............... | F03D 1/0641 |
| | | | | 416/1 |
| 2012/0070281 A1 | 3/2012 | Fuglsang et al. | | |
| 2012/0134837 A1 | 5/2012 | Drobietz et al. | | |
| 2012/0257977 A1 | 10/2012 | Jensen et al. | | |
| 2012/0269644 A1 * | 10/2012 | Enevoldsen | ............... | F03D 1/0641 |
| | | | | 416/235 |
| 2013/0071253 A1 | 3/2013 | Fischer | | |
| 2013/0164141 A1 | 6/2013 | Lin et al. | | |
| 2013/0223988 A1 | 8/2013 | Kristensen | | |
| 2013/0266441 A1 | 10/2013 | Enevoldsen | | |
| 2013/0280085 A1 | 10/2013 | Koegler | | |
| 2013/0323070 A1 | 12/2013 | Grabau | | |
| 2014/0048581 A1 | 2/2014 | Scirica et al. | | |
| 2014/0072441 A1 * | 3/2014 | Asheim | ............... | F03D 1/0683 |
| | | | | 416/241 R |
| 2014/0140856 A1 | 5/2014 | Madsen et al. | | |
| 2014/0219810 A1 | 8/2014 | Wurth et al. | | |
| 2015/0010407 A1 | 1/2015 | Zamora Rodriguez et al. | | |
| 2015/0078896 A1 | 3/2015 | Oerlemans | | |
| 2015/0078913 A1 * | 3/2015 | Enevoldsen | ............... | F03D 1/0633 |
| | | | | 416/241 R |
| 2015/0098821 A1 * | 4/2015 | Mayda | ............... | F03D 1/0683 |
| | | | | 416/23 |
| 2015/0267678 A1 | 9/2015 | Obrecht et al. | | |
| 2015/0292476 A1 | 10/2015 | Obrecht et al. | | |
| 2015/0316029 A1 | 11/2015 | Altmikus et al. | | |
| 2015/0361952 A1 | 12/2015 | Petsche et al. | | |
| 2016/0138563 A1 | 5/2016 | Altmikus | | |
| 2016/0252073 A1 | 9/2016 | Fuglsang et al. | | |
| 2017/0045031 A1 | 2/2017 | Asheim et al. | | |

(56) References Cited

U.S. PATENT DOCUMENTS

| | | | |
|---|---|---|---|
| 2017/0107970 A1* | 4/2017 | Arce | F03D 1/0641 |
| 2017/0122286 A1* | 5/2017 | Alexander | F03D 1/0633 |
| 2017/0138340 A1* | 5/2017 | Asheim | F03D 1/0675 |
| 2017/0276117 A1 | 9/2017 | Church | |
| 2017/0298740 A1 | 10/2017 | Vathylakis et al. | |
| 2018/0142671 A1* | 5/2018 | Asheim | F03D 1/0675 |
| 2020/0072185 A1 | 3/2020 | Wang et al. | |

FOREIGN PATENT DOCUMENTS

| | | |
|---|---|---|
| CN | 101498276 A | 8/2009 |
| CN | 102720631 A | 10/2012 |
| CN | 103987622 A | 8/2014 |
| CN | 104279129 A | 1/2015 |
| CN | 104454378 A | 3/2015 |
| CN | 104870808 A | 8/2015 |
| CN | 104976075 A | 10/2015 |
| CN | 106414999 A | 2/2017 |
| CN | 106481517 A * | 3/2017 |
| CN | 106481517 A | 3/2017 |
| EP | 1338793 A3 | 9/2010 |
| EP | 2647835 A1 | 10/2013 |
| EP | 2921697 A1 | 9/2015 |
| EP | 3096003 A1 | 11/2016 |
| EP | 3181895 A1 | 6/2017 |
| WO | 2014048581 A1 | 4/2014 |
| WO | 2015167604 A1 | 11/2015 |
| WO | WO 2015167604 A1 | 11/2015 |
| WO | 2016001420 A1 | 1/2016 |
| WO | WO 2016001420 A1 | 1/2016 |
| WO | 2017180192 A1 | 10/2017 |

OTHER PUBLICATIONS

Schepers et al.: "SIROCCO: Silent Rotors by Acoustic Optimization" presented at the 2nd International Meeting on Wind Turbine Noise, Lyons, France, Sep. 2007, ECN Technical Paper.

Oerlemans Stefan: "Detection of aeroacoustic sound sources on aircraft and wind turbines", http://doc.utwente.nl/67363/1/thesis S Oerlemans.pdf, chapters, ISBN 978-90-80-6343-9-8; 2009.

Oerlemans Stefan: "Detection of aeroacoustic sound sources on aircraft and wind turbines", http://doc.utwente.nl/67363/1/thesis S Oerlemans.pdf, chapter 8, ISBN 978-90-80-6343-9-8; 2009.

Office Action in related Chinese Patent Application No. 201910567004.0 dated Apr. 12, 2021. 8 pages.

* cited by examiner

AERODYNAMIC STRUCTURE

CROSS-REFERENCE TO RELATED APPLICATION

This application claims priority to European Application No. 18180141.6, having a filing date of Jun. 27, 2018, the entire contents of which are hereby incorporated by reference.

FIELD OF TECHNOLOGY

The following describes an aerodynamic structure for a wind turbine rotor blade, a wind turbine rotor blade with such an aerodynamic structure, and a method of equipping a wind turbine rotor blade with an aerodynamic structure.

BACKGROUND

The level of noise generated by a wind turbine is a major factor that determines whether permission will be given to erect a wind turbine of that type, particularly when the site is close to a residential area. Generally, the noise originating from the aerodynamic rotor is regarded as most troublesome. Therefore, much effort is being invested in finding ways to reduce the noise generated by wind turbine rotor blades as these move through the air. The simplest way to reduce noise originating from an aerodynamic rotor is to reduce its rotational speed, but this is directly associated with a substantial penalty in power output. Therefore, it would be more preferable to identify other ways of reducing the level of noise.

For a large wind turbine with rotor blade lengths in excess of 20-30 m, the dominant noise source is trailing edge noise. Eddies develop when the air flows over the suction side and pressure side, resulting in turbulence passing the trailing edge of the blade, causing trailing edge noise. The cause of trailing edge noise can also be regarded as a distribution of unstable surface pressures at the trailing edge. The surface pressures are the footprint or signature of the turbulent boundary layer. Trailing edge noise is mainly generated in the outer portion of a rotor blade, i.e. in the outer airfoil region, on account of the higher rotational velocities.

There are various ways of modifying a rotor blade with the aim of reducing trailing edge noise. For example, instead of a straight trailing edge, the trailing edge can be given a serrated or "sawtooth" shape along an outer portion of the rotor blade. The serrations effectively reduce the scattering of vortices at the trailing edge. However, while such a serrated edge can reduce the trailing edge noise to some extent, it cannot eliminate the noise completely. Therefore, while trailing edge serrations can reduce trailing edge noise, significant noise levels remain.

The noise-reducing effect of trailing edge serrations can be improved by arranging comb elements between the serrations. A comb element originates along the edges of two adjacent serrations, and terminates at a terminating line defined by the tips of those serrations. Such comb elements lie in the same plane as the serrations, i.e. the comb teeth lie close to the main airflow direction. The beneficial acoustic effect of such comb elements may be understood to arise from diffusion of a horseshoe vortex (i.e. the combs between serrations break up a large vortex into smaller vortices) and/or dissipation of some of the energy in the turbulent airflow.

While serrations and in-plane comb elements can have a noticeable positive effect on the trailing edge noise by diffusing turbulence immediately behind the trailing edge, they do not have a significant effect on turbulence that is present upstream of the trailing edge. Therefore, the known solutions have limited capability in reducing the aerodynamic noise generated by a rotor blade.

SUMMARY

An aspect relates to an improved way of reducing the noise generated by a wind turbine rotor blade.

According to embodiments of the invention, the aerodynamic structure is to be mounted to a surface of a wind turbine rotor blade and comprises a plurality of rectangular comb elements and/or a plurality of angular or V-shaped comb elements, wherein a comb element comprises comb teeth arranged in a comb plane that subtends an angle to the surface of the rotor blade. In the context of embodiments of the invention, the comb plane of a rectangular comb element can be understood to have the shape of a rectangle, while the comb plane of an angular comb element can be understood to have a chevron shape, as will be made clear by the drawings.

It is known to mount various kinds of structure on an airfoil in order to reduce the noise generated by the rotor blade, for example a porous shield or cover that reduces scattering of the surface pressures at the airfoil trailing edge. This porous structure can extend over a significant portion of the rotor blade in the outboard region. However, such structures may not reduce trailing edge noise to an entirely satisfactory level. The embodiments are based on the insight that trailing edge noise can be further reduced when the boundary layer is pushed away from the airfoil surface. The reduction in noise is understood to arise from the increased distance between turbulence over the airfoil and the trailing edge, so that there is less acoustic scattering of vortices at the trailing edge. The embodiments provide a means of achieving this effect, by arranging a plurality of comb elements on the rotor blade. The aerodynamic structure can comprise two or more rectangular comb elements arranged in a parallel formation, and/or a plurality of angular or V-shaped comb elements arranged along the trailing edge of the rotor blade.

A comb element is inclined at an angle in the range of 0° to 45° relative to the airfoil surface of the rotor blade. Since each comb element has an overall planar shape as defined above, each comb element acts as a "canopy" to push the boundary layer outward from the rotor blade. In the following, a rectangular or angular comb element may be referred to as a "canopy comb element" with the attendant beneficial effect described above, namely to move larger boundary layer vortices further outward from the airfoil surface in order to suppress acoustic scattering at the trailing edge. In addition to this function, the comb fibres of a canopy comb element can act as a span-wise separator on a turbulent airflow over the airfoil surface of the blade. The effect of this span-wise flow separation is to stabilize the turbulent airflow by transforming large vortices into a greater number of smaller vortices, which will generate less audible noise when passing over the trailing edge.

According to embodiments of the invention, a wind turbine rotor blade comprises such an aerodynamic structure mounted on a surface of the rotor blade. The aerodynamic structure extends for example along the outer half or outer third of a rotor blade. With such an aerodynamic structure in place, the acoustic noise can be significantly reduced. The noise emissions of a wind turbine that is equipped with such rotor blades can be effectively reduced. During operation of the wind turbine, the rotor blades move through the air, so that an airflow passes over a rotor blade, and the airflow will first pass over the aerodynamic structure before reaching the trailing edge of the rotor blade. Turbulence near the trailing edge of a rotor blade can be reduced to a great extent, so that the wind turbine may fulfil the requirements of applicable acoustic noise regulations when operating at its rated power output. Another advantage is that it may be possible to install such wind turbines closer to acoustically sensitive areas. Without noise-reducing measures, many onshore wind turbines must be curtailed, i.e. operated at reduced power, in order to meet the applicable noise limits. When the aerodynamic noise is reduced, for example by deploying the aerodynamic structure, such wind turbines can be curtailed less, meaning they produce more energy while staying within the noise limit. The aerodynamic structure can be used when installing new wind turbines and also to retrofit existing wind turbines.

Particularly advantageous embodiments and features of the invention are given by the dependent claims, as revealed in the following description. Features of different claim categories may be combined as appropriate to give further embodiments not described herein.

A canopy comb element can be made of any suitable material, for example a suitable polymer or plastic. A canopy comb element can be made using any suitable technique such as injection moulding, casting, etc. The comb fibres or comb teeth of a canopy comb element are parallel to each other, and are spaced apart by a sufficient distance. For example, comb fibres may have a diameter in the order of 1.0 mm and may be spaced apart by a distance that is about the same as the comb fibre diameter.

The aerodynamic structure can be constructed in any suitable manner. In preferred embodiments of the invention, the aerodynamic structure is manufactured by forming the canopy comb elements and embedding the teeth of a canopy comb element to a suitable depth in the mounting means along a mounting line. The series of points from which the teeth of a canopy comb element extend outward from the mounting means may be regarded collectively as the "mounting line" of that canopy comb element. In an alternative embodiment, the aerodynamic structure is manufactured by forming the canopy comb elements and gluing the inner ends of the teeth of a canopy comb element along a mounting line on the surface of the mounting means. In a further alternative embodiment, the aerodynamic structure is manufactured by forming the canopy comb elements, forming holes in the mounting means along a mounting line and, from underneath the mounting means, passing the teeth of a canopy comb element through the holes. The mounting means may be realised as a strip of material (for example a strip of plastic) that is glued or otherwise attached to the outer surface of the rotor blade, so that an already existing rotor blade may be retro-fitted with one or more instances of the aerodynamic structure.

A mounting surface can be a surface of the rotor blade airfoil. An embodiment of the aerodynamic structure is mounted to the suction side of the rotor blade. Equally, a mounting surface can be the surface of a trailing edge assembly arranged along the trailing edge of the rotor blade. Alternatively or in addition, an embodiment of the aerodynamic structure can be mounted to the pressure side of the rotor blade. An embodiment of the aerodynamic structure extends over the outboard 50% of the rotor blade.

A canopy comb element is arranged on a mounting means realised for mounting the comb element to a mounting surface of the rotor blade. A canopy comb element is generally arranged along a root-to-tip direction, and the mounting means is attached to the airfoil surface of the blade in a span-wise direction, i.e. in a direction defined by a line extending between the blade root and the blade tip, or in a direction defined by the trailing edge of the rotor blade, so that the canopy comb element essentially extends in a span-wise direction. The mounting surface can include a surface of a trailing edge assembly of the rotor blade, for example an angular or chevron comb element can be mounted partially or completely onto a serration of a serrated trailing edge assembly.

In preferred embodiments of the invention, a mounting means of a rectangular canopy comb element is attached to the airfoil surface of the rotor blade at a distance inward (i.e. upstream) from the trailing edge. The distance inward from the trailing edge can be determined by computation using suitable models and/or on the basis of observations obtained from tests such as wind tunnel tests, acoustic measurements in the field, etc. In such an embodiment, the mounting line of a rectangular canopy comb element is effectively arranged at a distance upwind of the trailing edge.

The comb teeth of a rectangular comb element originate along an essentially straight mounting line that runs parallel to the trailing edge of the rotor blade. Similarly, the comb teeth of such a rectangular comb element terminate along a terminating line that is essentially parallel to the mounting line.

When rectangular comb elements are used, the aerodynamic structure comprises at least two rectangular comb elements mounted on an airfoil surface of the rotor blade such that the comb teeth of a first rectangular comb element are offset relative to the comb teeth of a second rectangular comb element. For example, the comb teeth of one rectangular comb element can be aligned with the gaps between comb teeth of the adjacent rectangular comb element.

When angular comb elements are used, the comb teeth of an angular comb element originate along a mounting line that describes a saw-tooth contour along the trailing edge of the rotor blade. If the rotor blade is equipped with a serrated trailing edge assembly, the sawtooth contour follows the contour of the serrated trailing edge. The angular comb elements can be mounted on the airfoil surface of the rotor blade and/or on the serrations of a serrated trailing edge assembly. For example, a row of angular comb elements can be mounted on an airfoil surface so that the tips of the comb teeth terminate over the airfoil surface, i.e. they do not extend beyond the trailing edge. Alternatively, a row of angular comb elements can be mounted on the rotor blade so that the tips of some or all of the comb teeth extend beyond the trailing edge. In such an embodiment, the angular comb elements can be entirely or partially mounted on serrations of a trailing edge assembly, and the terminating lines of the angular comb elements follow the sawtooth shape of the serrations.

As described above, the comb plane of a canopy comb element contains the parallel mounting and terminating lines, and the comb plane is inclined at an angle to the mounting surface, at an angle of up to 45°. To maintain this angle of inclination under all operating conditions, a canopy comb element comprises a number of supporting ribs arranged to maintain the angle of inclination of the comb plane. Each comb tooth can be supported by such a supporting rib. A supporting rib is inclined at a relatively flat angle so that it presents as little resistance as possible to the incoming airflow.

In preferred embodiments of the invention, the supporting ribs of a rectangular canopy comb element mounted on a first airfoil surface extend beyond the trailing edge of the rotor blade to form a further comb element that extends outward from the trailing edge on the other side of the rotor blade. In other words, the canopy comb element is on one side of the chord plane of the airfoil, while the further comb element (comprising the extended supporting ribs) is on the other side of the chord plane.

This concept can be taken further when rectangular canopy comb elements are arranged on both sides of the airfoil in a mirrored arrangement, i.e. a rectangular canopy comb element on the suction side and an identical rectangular canopy comb element on the pressure side. For example, in preferred embodiments of the invention, a suction-side rectangular canopy comb element is mounted so that its supporting ribs extend beyond the trailing edge into the space "below" the chord plane, and a pressure-side rectangular canopy comb element is mounted so that its supporting ribs extend beyond the trailing edge into the space "above" the chord plane.

In such an embodiment, physically separate comb elements can mounted at the trailing edge, with a first canopy comb element on the suction side and a second canopy comb element on the pressure side, arranged at an offset so that the supporting ribs of one canopy comb element extend between the supporting ribs of the other canopy comb element.

Alternatively, the supporting ribs of such canopy comb elements can be joined at their point of intersection at the trailing edge of the rotor blade. This can be achieved by a suitable injection moulding process to manufacture the "mirrored" canopy comb elements, or by fusing or bonding the supporting ribs of separate comb elements at the appropriate nodes or points.

As mentioned in the introduction, a wind turbine rotor blade can be equipped with serrations along a portion of its trailing edge for the purpose of reducing aerodynamic noise. Such a serrated trailing edge assembly can be augmented by in-plane comb elements arranged between the serrations. Such an in-plane comb element lies in the same plane as the trailing edge serrations, i.e. in the same plane as the airflow over the rotor blade.

BRIEF DESCRIPTION

Some of the embodiments will be described in detail, with references to the following Figures, wherein like designations denote like members, wherein.

DETAILED DESCRIPTION

Figure 1:
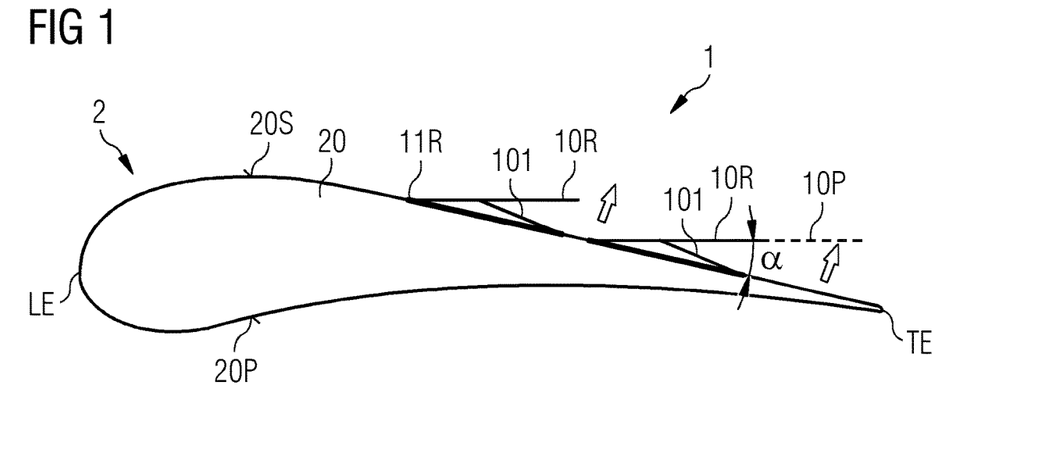
FIG. 1 shows a first embodiment of an aerodynamic structure.

FIG. 1 shows an embodiment of the aerodynamic structure 1, attached to the suction side 20S of a wind turbine rotor blade 2. The diagram indicates a cross-section through an airfoil 20 in an outboard region of the blade 2. In this exemplary embodiment, the aerodynamic structure 1 comprises two rectangular canopy comb elements 10R arranged on a mounting means 11R in such a way that the rectangular comb elements 10 act together as a canopy to push the boundary layer outward from the airfoil surface 20S as indicated by the short arrows. Each canopy comb element 10R subtends a relatively oblique angle $\alpha$ to the airfoil surface 20S, and this angle does not exceed 45°. The different canopy comb elements 10R can subtend different angles to the airfoil surface 20S, depending on their position on the airfoil 20. To ensure that the angle $\alpha$ between the comb plane 10P and the airfoil surface 20S is maintained, each comb tooth or fibre may be supported by a supporting rib 101 that also subtends an oblique angle to the airfoil surface 20S. There are a number of ways of realising and mounting a canopy comb element 10R. For example, a canopy comb element 10R can be cast as one piece with a mounting plate 11R, which can be attached to a suitable region of the rotor blade surface.

Figure 2:
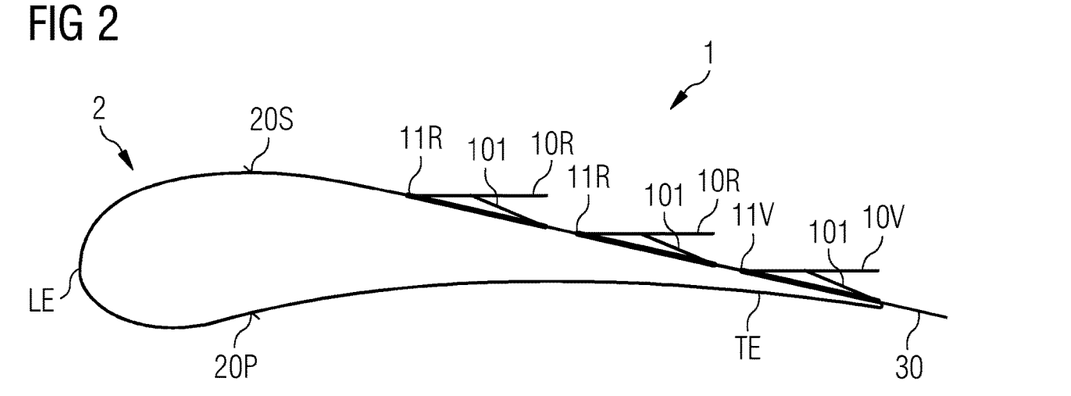
FIG. 2 shows a second embodiment of the aerodynamic structure.

FIG. 2 shows a further embodiment, in this case the two rectangular canopy comb elements 10R of FIG. 1 are augmented by another canopy comb element 10V mounted to extend into a trailing edge assembly 3 that is attached to the trailing edge TE of the rotor blade 2.

Figure 3:
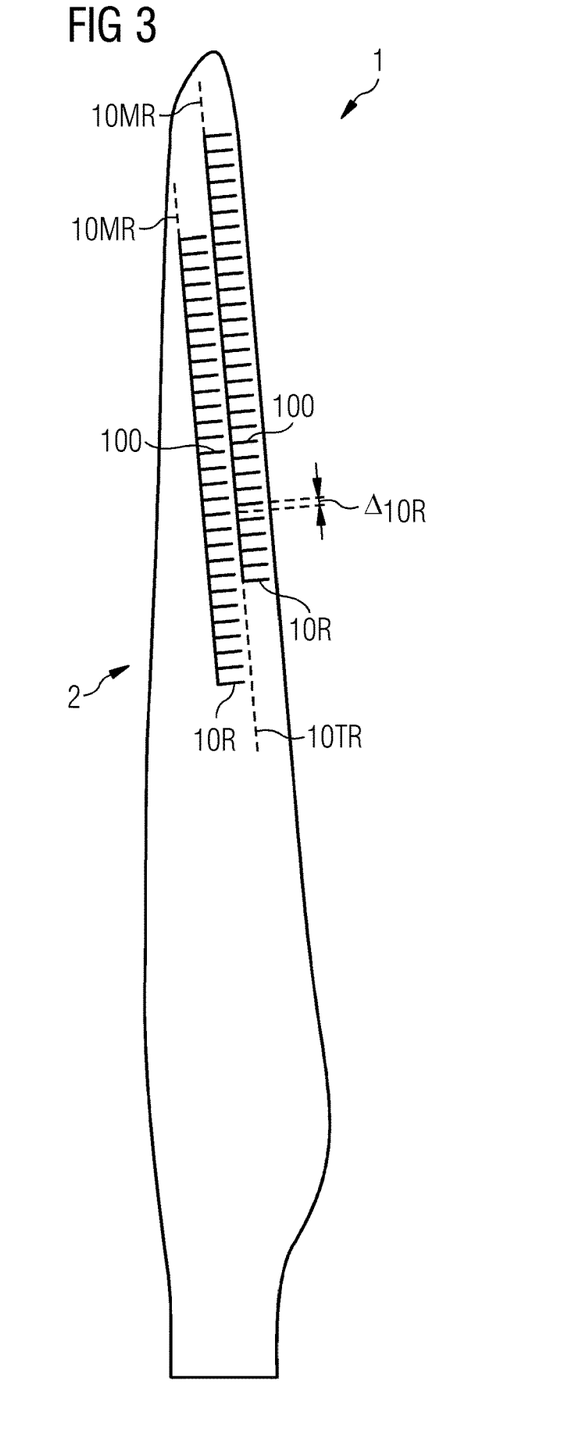
FIG. 3 shows a third embodiment of the aerodynamic structure.

FIG. 3 shows a plan view of an embodiment of the aerodynamic structure 1, similar to that of FIG. 1. The diagram shows two rectangular canopy comb elements 10R, each comprising an array of comb fibres 100 arranged in parallel to form an overall rectangular shape. The comb fibres 100 of a canopy comb element 10R originate along a mounting line 10MR and terminate at terminating line 10TR. In this case, the mounting lines 10MR and terminating lines 10TR are essentially parallel to the trailing edge TE of the blade 2. The diagram also indicates that the rectangular canopy comb elements 10R are mounted on the blade surface so that the comb fibres 100 of one canopy comb element 10R are offset from the fibres 100 of the other canopy comb element 10R. This can improve the span-wise separation of turbulence over the airfoil surface. In this exemplary embodiment, the rectangular canopy comb elements 10R are essentially identical, but offset by a distance $\Delta_{10R}$ corresponding to half the distance between comb fibres. In an alternative realisation, the canopy comb elements 10R could be different, with the comb fibres of one canopy comb element 10R closer together than the comb fibres of the other canopy comb element 10R.

Figure 4:
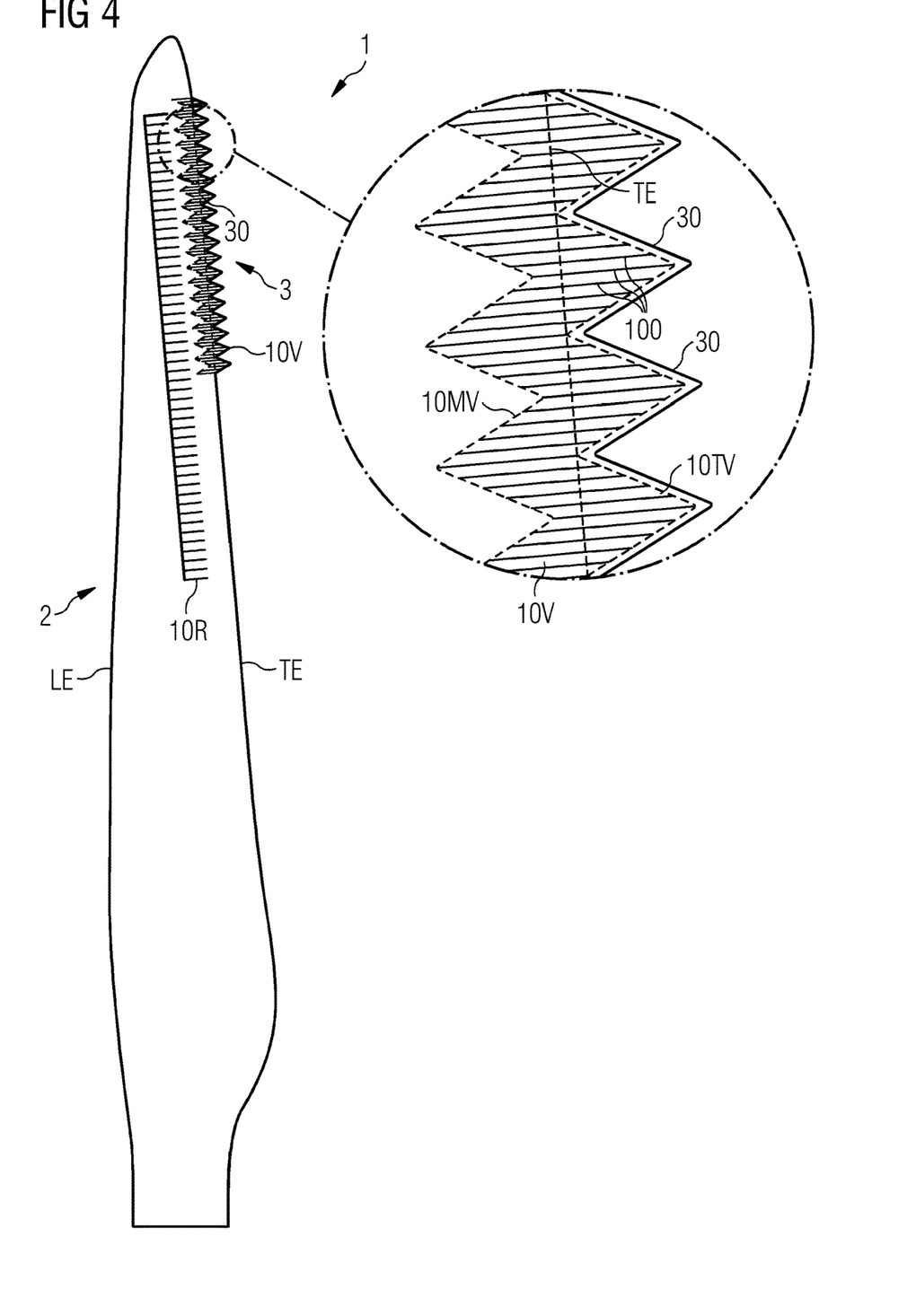
FIG. 4 shows a fourth embodiment of the aerodynamic structure.

FIG. 4 shows a plan view of another embodiment of the aerodynamic structure 1, similar to that of FIG. 2. The diagram shows a rectangular canopy comb element 10R of the type described in FIG. 3. The rotor blade 2 also has a serrated trailing edge assembly 3, i.e. a series of serrations 30 is arranged along the trailing edge TE to reduce the aerodynamic noise arising from the passage of vortices past the rotor blade's trailing edge as it passes through the air. In this embodiment, an angular canopy comb element 10V is mounted to extend over the serrations 30 of the trailing edge assembly 3. The mounting line 10MV and terminating line 10TV of the comb fibres 100 of the angular canopy comb element 10V follow the saw-tooth contour of the serrations 30.

Figure 5:
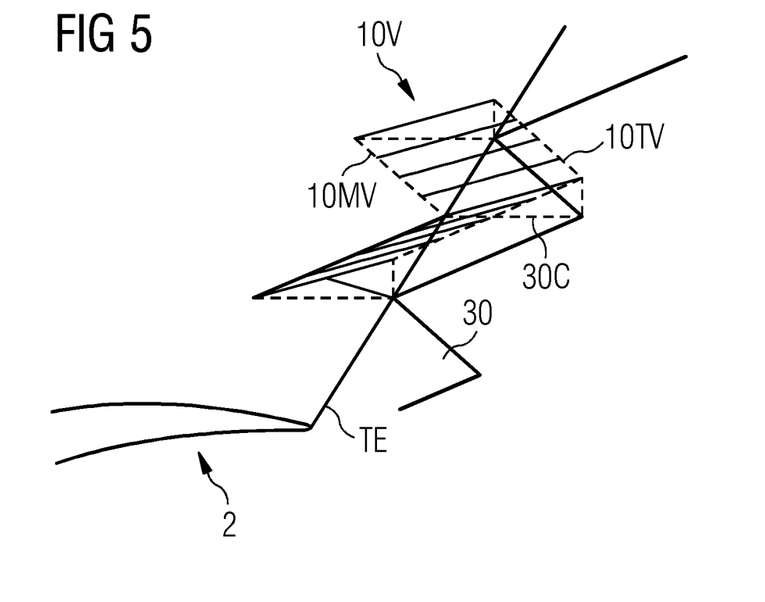
FIG. 5 shows a detail view of an angular comb element in an embodiment of the aerodynamic structure.

FIG. 5 shows another view of an angular canopy comb element 10V, indicating how it might be mounted relative to a serration 30 of a trailing edge assembly. The mounting line 10MV and the terminating line 10TV are both V-shaped, so that the shape of the comb element 10V follows the shape of a serration 30 at the trailing edge TE of the rotor blade 2. The angular canopy comb element 10V is mounted symmetrically about a centre line 30C of a serration 30. While the diagram only shows one such angular canopy comb element 10V, it shall be understood that a series of such angular canopy comb element 10V may be mounted along the trailing edge TE of the blade 2, and may be combined with one or more rectangular canopy comb elements 10R as described above.

Figure 6:
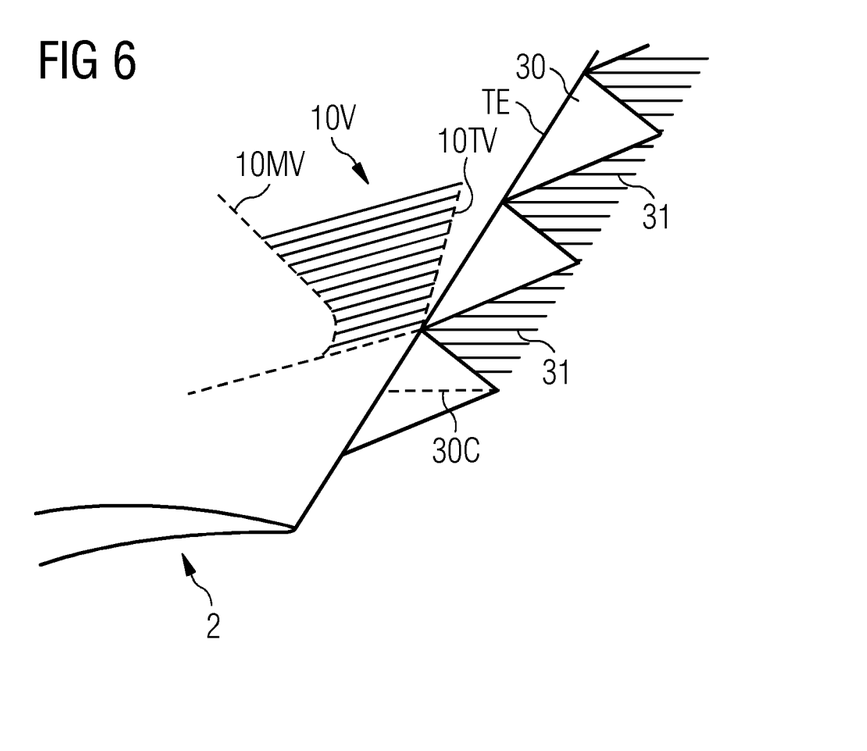
FIG. 6 shows a detail view of a further angular comb element in an embodiment of the aerodynamic structure.

In FIG. 6, the mounting line 10MV and the terminating line 10TV of an angular canopy comb element 10V are both curved, so that the shape of the angular comb element 10V follows a curve in space. The drawing shows a trailing edge assembly mounted to the trailing edge TE of the blade 2, and comprising a series of serrations 30 with in-plane comb elements 31. Here, the terminating line 10TV of the canopy comb element 10V essentially lies above the trailing edge TE of the rotor blade 2, with its maximum height coinciding with the centre line 30C of a serration 30, and its minimum height coinciding with an inner apex at the junction of two serrations 30. In such an embodiment, turbulence around the serration centreline 30C is diffused by the upstream angular canopy comb element 10V. In this case also, while the diagram only shows one such angular canopy comb element 10V, it shall be understood that a series of such angular canopy comb element 10V may be mounted along the trailing edge TE of the blade 2, and may be combined with one or more rectangular canopy comb elements 10R as described above. The in-plane comb elements 31 between neighbouring serrations 30 have the effect of further reducing the trailing edge noise. The serrations 30 and in-plane comb elements 11 can be cast or injection-moulded as one piece with a mounting plate for attaching along the trailing edge TE of the rotor blade surface, for example on the pressure side.

Figure 7:
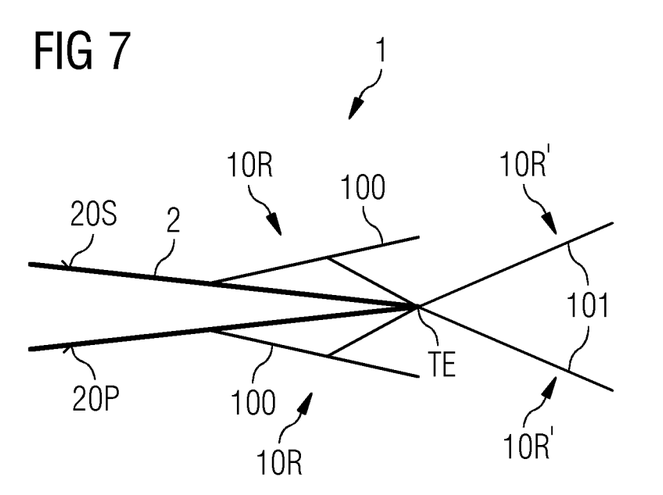
FIG. 7 shows a cross-section through a further embodiment of the aerodynamic structure.

FIG. 7 shows a further embodiment of the aerodynamic structure 1. A cross-section is shown through the airfoil portion of a rotor blade 2 and the diagram shows the region near the trailing edge TE. In this embodiment, a first rectangular canopy comb element 10R is mounted on the suction side 20S, and a second rectangular canopy comb element 10R is mounted on the pressure side 20P. The supporting ribs 101 of the comb fibres 100 extend from a point along the comb fibre 100 to the trailing edge TE, where they are anchored. Instead of terminating at the trailing edge TE, the supporting ribs 101 extend beyond the trailing edge TE to create a further canopy comb element 10R' beyond the trailing edge TE, referred to herein as a "trailing edge canopy comb element" 10R'.

Figure 8:
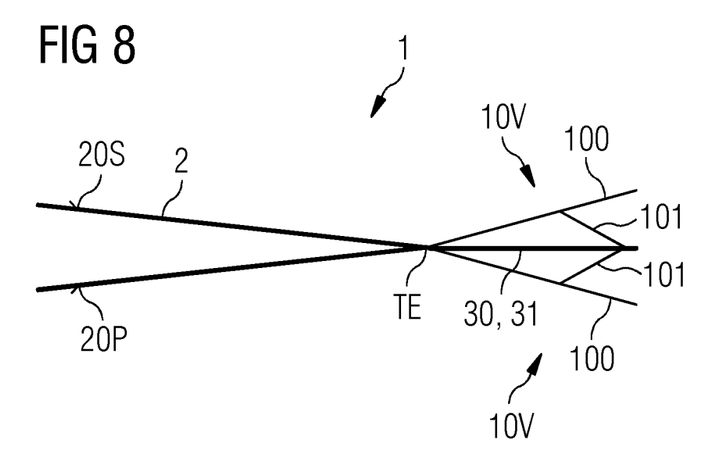
FIG. 8 shows a cross-section through a further embodiment of the aerodynamic structure.

FIG. 8 shows a similar structure. Again, a cross-section is shown through the airfoil portion of a rotor blade 2 and the diagram shows the region near the trailing edge TE. In this embodiment, the mounting line of an angular canopy comb element 10V coincides with the trailing edge TE, and the angular canopy comb element 10V is inclined at an angle to the plane of a serration 30 and in-plane comb element 31. In this embodiment, a supporting rib 101 of a comb fibre 100 extends from a point along the comb fibre 100 either to the tip of a serration 30 or to the outer end of a fibre of a serration comb element 31.

Figure 9:
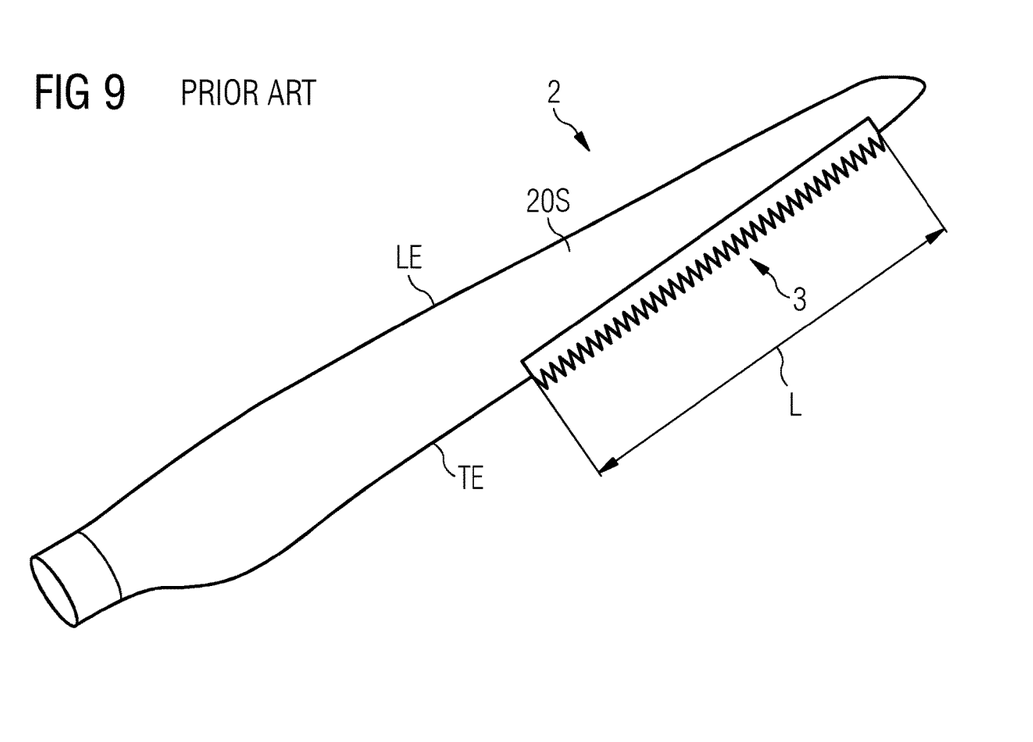
FIG. 9 shows a rotor blade of a wind turbine.

FIG. 9 shows a rotor blade 2 of a wind turbine. The diagram shows the leading edge LE, trailing edge TE and suction side 20S. In the known art, it is known to attach a serrated component 3 along a mounting length L of the trailing edge TE. In the embodiments of the aerodynamic structure 1 described above, any canopy comb elements as described in FIGS. 1-8 above be assumed to be attached to a mounting surface of the rotor blade 2 over a similar mounting length L.

Figure 10:
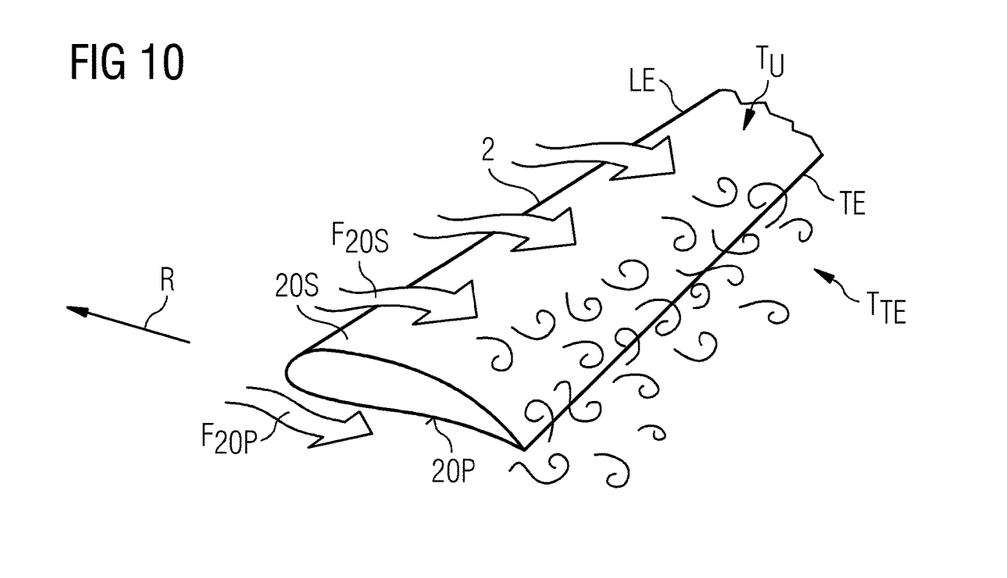
FIG. 10 illustrates the development of turbulence over a rotor blade.

FIG. 10 illustrates the development of turbulence as a rotor blade 2 moves in a direction of rotation R. The diagram shows an initially laminar airflow $F_{20S}$ in the boundary layer over the suction side 20S of the rotor blade 2, and an initially laminar airflow $F_{20P}$ in the boundary layer over the pressure side 20P of the rotor blade 2. The boundary layer generally cannot remain stable, and turbulence $T_U$ arises upstream of the trailing edge TE (potentially also on the pressure side 20P). Further turbulence $T_{TE}$ develops at the trailing edge TE. Acoustic noise is mainly generated by passage of vortices $T_{TE}$ past the trailing edge. The aerodynamic structure 1 acts to push the boundary layer outward from the airfoil surface and also to smoothen the airflow over the airfoil surface, reducing the severity of turbulence near the trailing edge. Because it results in smaller vortices in the trailing edge turbulence, and less turbulence overall, the aerodynamic structure 1 can significantly reduce trailing edge noise.

Although the present invention has been disclosed in the form of preferred embodiments and variations thereon, it will be understood that numerous additional modifications and variations could be made thereto without departing from the scope of the invention For the sake of clarity, it is to be understood that the use of "a" or "an" throughout this application does not exclude a plurality, and "comprising" does not exclude other steps or elements.

The invention claimed is:

1. An aerodynamic structure for mounting to a surface of a wind turbine rotor blade, the aerodynamic structure comprising:
   a first comb element comprising comb teeth that are inclined at an angle up to 45° relative to the surface of the rotor blade, the first comb element being offset a distance from a trailing edge of the rotor blade toward a leading edge of the rotor blade;
   a second comb element comprising comb teeth that are inclined at an angle to the surface of the rotor blade, wherein the comb teeth of the second comb element are offset relative to the comb teeth of the first comb element such that the first comb element partially overlaps the second element in a direction parallel to the trailing edge of the rotor blade;
   wherein the first comb element originates at a first mounting line along the rotor blade and the second comb element originates at a second mounting line along the rotor blade that is closer to the trailing edge of the rotor blade than the first mounting line;
   wherein a plurality of supporting ribs are arranged to maintain the angle of the comb teeth of the first comb element to the surface of the rotor blade, the plurality of ribs contacting the surface of the rotor blade and extending towards the leading edge at an incline to contact the comb teeth of the first comb element and the second comb element;
   wherein the first mounting line and the second mounting line each extend in a direction that is parallel to the trailing edge of the rotor blade and angled with respect the leading edge of the rotor blade.

2. The aerodynamic structure according to claim 1, wherein the comb element is mounted to a mounting surface of the rotor blade.

3. The aerodynamic structure according to claim 1, wherein the surface of the rotor blade is an airfoil surface of the rotor blade.

4. The aerodynamic structure according to claim 3, wherein the comb teeth of the first comb element terminate along a first terminating line, the first terminating line extending in a direction that is parallel to the trailing edge of the rotor blade.

5. The aerodynamic structure according to claim 1, wherein comb teeth of an angular comb element includes a saw-tooth contour along the trailing edge of the rotor blade.

6. The aerodynamic structure according to claim 5, wherein the comb teeth of the angular comb element extend over a serration of a trailing edge assembly mounted along the trailing edge of the rotor blade.

7. A wind turbine rotor blade comprising:
an aerodynamic structure having
a first comb element comprising comb teeth that are inclined at an angle up to 45° relative to the surface of the rotor blade, the first comb element being offset a distance from a trailing edge of the rotor blade toward a leading edge of the rotor blade;
a second comb element comprising comb teeth that are inclined at an angle to the surface of the rotor blade, wherein the comb teeth of the second comb element are offset relative to the comb teeth of the first comb element such that the first comb element partially overlaps the second element in a direction parallel to the trailing edge of the rotor blade;
wherein the first comb element originates at a first mounting line along the rotor blade and the second comb element originates at a second mounting line along the rotor blade that is closer to the trailing edge of the rotor blade than the first mounting line;
wherein a plurality of supporting ribs are arranged to maintain the angle of the comb teeth of the first comb element to the surface of the rotor blade, the plurality of ribs contacting the surface of the rotor blade and extending towards the leading edge at an incline to contact the comb teeth of the first comb element and the second comb element;
wherein the first mounting line and the second mounting line each extend in a direction that is parallel to the trailing edge of the rotor blade and angled with respect the leading edge of the rotor blade.

8. The wind turbine rotor blade according to claim 7, wherein the surface is a mounting surface, which is any of: a suction side of the rotor blade, a pressure side of the rotor blade, a serration of a trailing edge assembly of the rotor blade.

9. The wind turbine rotor blade according to claim 7, further comprising a plurality of comb elements mounted between serrations of a trailing edge assembly of the rotor blade.

10. The aerodynamic structure according to claim 1, wherein the first comb element extends in a spanwise direction of the rotor blade, and the second comb element extends in the spanwise direction and parallel to the first comb element.

11. The wind turbine rotor blade according to claim 7, wherein the first comb element extends in a spanwise direction of the rotor blade, and the second comb element extends in the spanwise direction and parallel to the first comb element.

12. An aerodynamic structure for mounting to a surface of a wind turbine rotor blade, the aerodynamic structure comprising:
a first canopy comb element comprising comb teeth that are inclined at an angle up to 45° relative to a surface of the rotor blade, the first comb element mounted on a suction side of the rotor blade;
a second canopy comb element comprising comb teeth that are inclined at an angle to the surface of the rotor blade, the second comb element mounted on a pressure side of the rotor blade;
a first plurality of ribs that extend from the comb teeth of the first comb element towards a trailing edge of the rotor blade; and
a second plurality of ribs that extend from the comb teeth of the second comb element towards the trailing edge, wherein the first plurality of ribs and the second plurality of ribs extend beyond the trailing edge to form a trailing edge canopy comb element.

13. The aerodynamic structure according to claim 12, wherein the first plurality of ribs and the second plurality of ribs are joined at a point corresponding to the trailing edge of the rotor blade.

* * * * *